United States Patent [19]

Suko

[11] Patent Number: 4,636,941
[45] Date of Patent: Jan. 13, 1987

[54] METHOD AND APPARATUS FOR ANALYSIS OF MICROPROCESSOR OPERATION

[75] Inventor: Shouichi Suko, Tokyo, Japan

[73] Assignee: Iwatsu Electric Co., Ltd., Japan

[21] Appl. No.: 612,911

[22] Filed: May 22, 1984

[30] Foreign Application Priority Data

May 24, 1983 [JP] Japan ................................. 58-90079
May 24, 1983 [JP] Japan ................................. 58-90080

[51] Int. Cl.$^4$ ............................................. G06F 11/30
[52] U.S. Cl. ......................................... 364/200; 371/17
[58] Field of Search ................... 371/17, 29, 15-20; 364/200 MS File, 900 MS File

[56] References Cited

U.S. PATENT DOCUMENTS

| | | | |
|---|---|---|---|
| 3,813,531 | 5/1974 | King et al. | 371/17 |
| 3,937,938 | 2/1976 | Matthews | 371/17 |
| 3,939,453 | 2/1976 | Schroeder | 371/17 |
| 4,063,221 | 12/1977 | Watson et al. | 364/900 |
| 4,498,130 | 2/1985 | Uchida | 371/17 |

OTHER PUBLICATIONS

J. Smith, "A Logic State Analyzer for Microprocessor Systems", Hewlett-Packard, 1977.
Tom Williams, "Logic Analyzers Rise to the Challenge of Microprocessors", Computer Design, Apr. 5, 1983, pp. 155-164.

Primary Examiner—David Y. Eng
Attorney, Agent, or Firm—Paul & Paul

[57] ABSTRACT

A method for analyzing the operation of a microprocessor connected to a system to be tested and a plurality of buses includes the following steps. From the information concerning bus signal states and instruction execution, only information for cases other than interrupt routine processes and subroutine processes is selected, and the selected information is stored into a memory device, and then an analysis of the operation of the microprocessor on the basis of the selected and stored information is carried out. Alternatively, from the information concerning bus signal states and instruction execution, only information for cases other than executions of a stack pointer changing instructions and interrupt response processes is selected, and the selected information is stored into a memory device, and then an analysis of operation of the microprocessor on the basis of the selected and stored information is carried out. Apparatuses for these methods are also disclosed.

3 Claims, 23 Drawing Figures

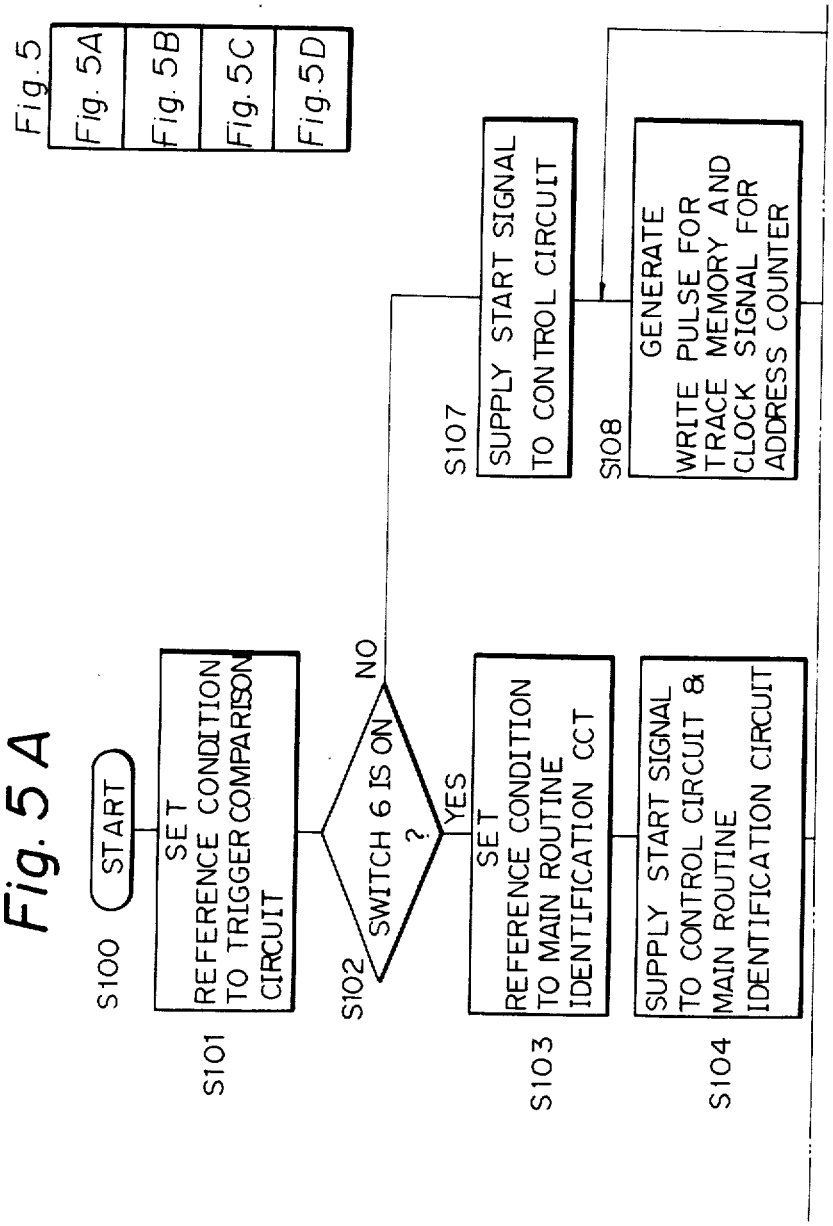

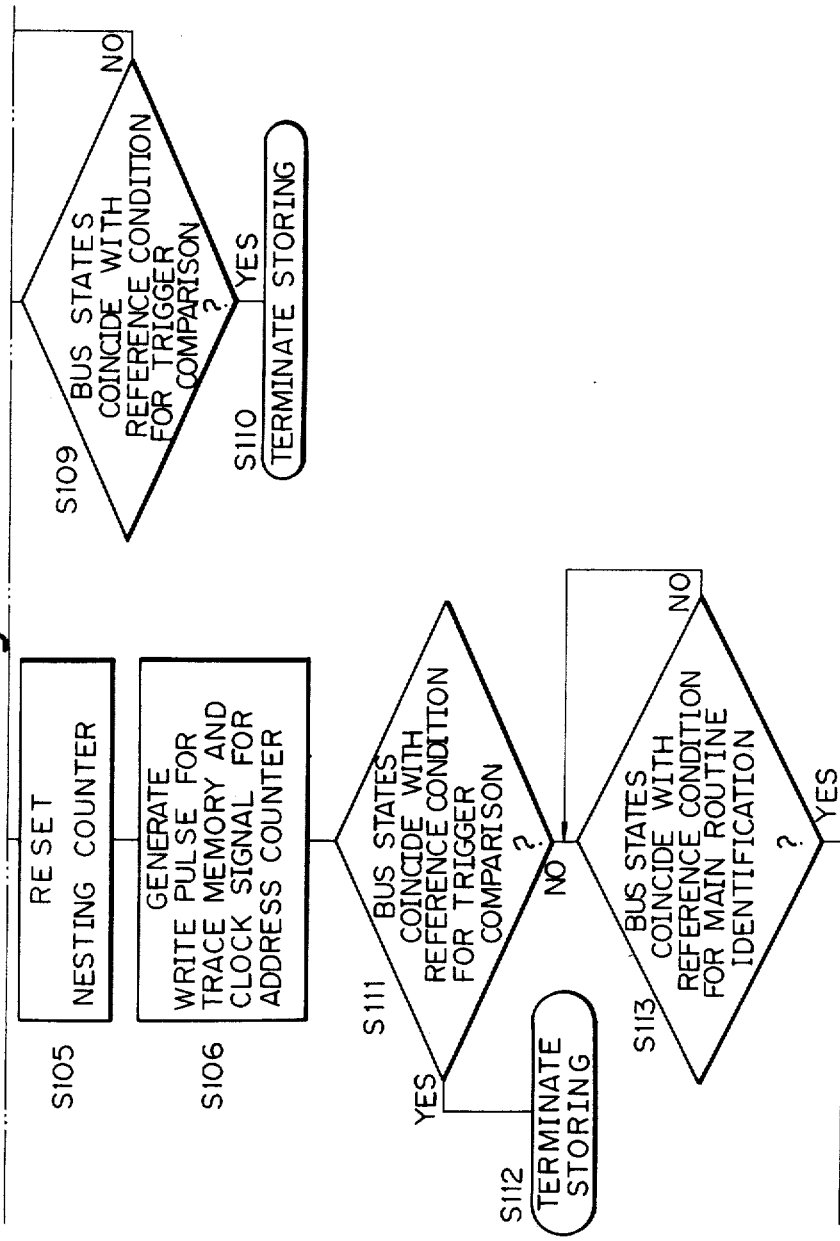

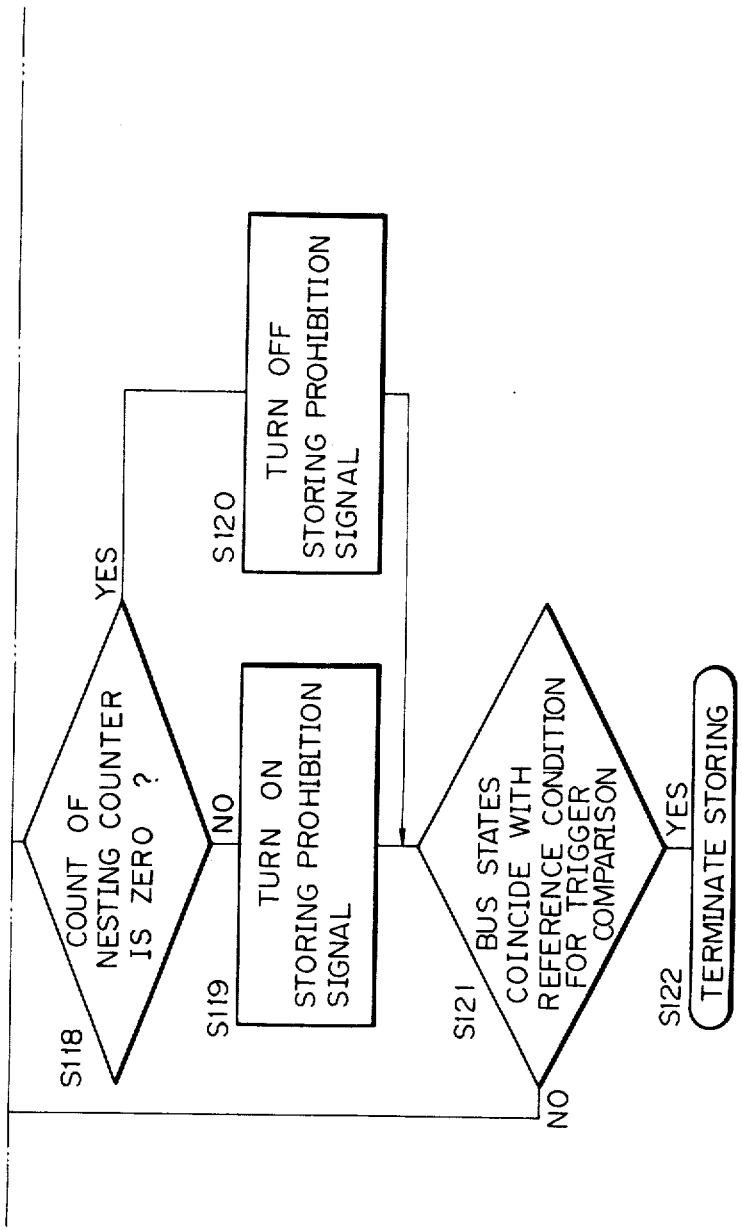

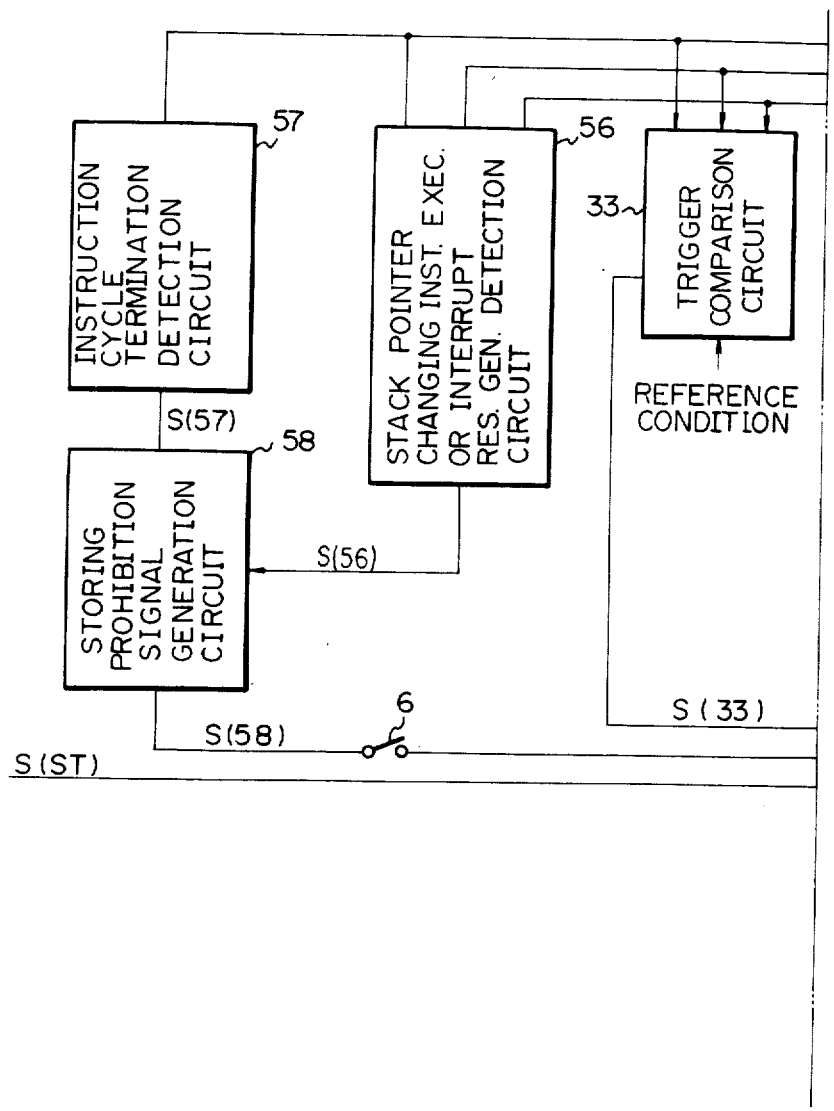

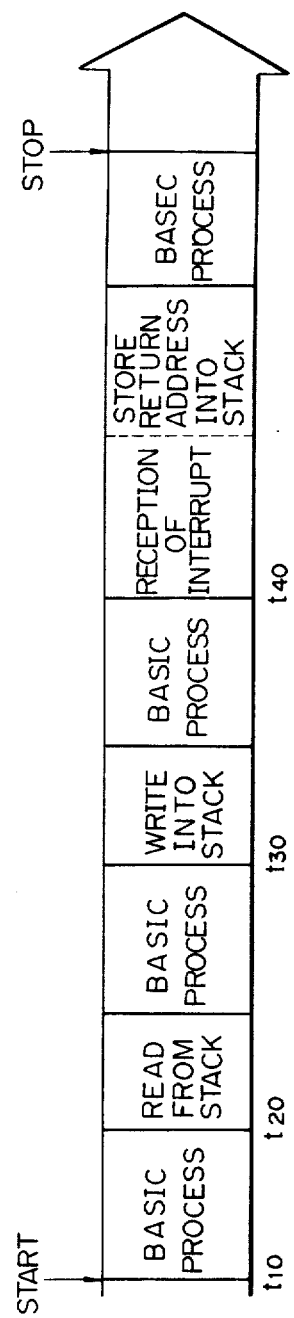

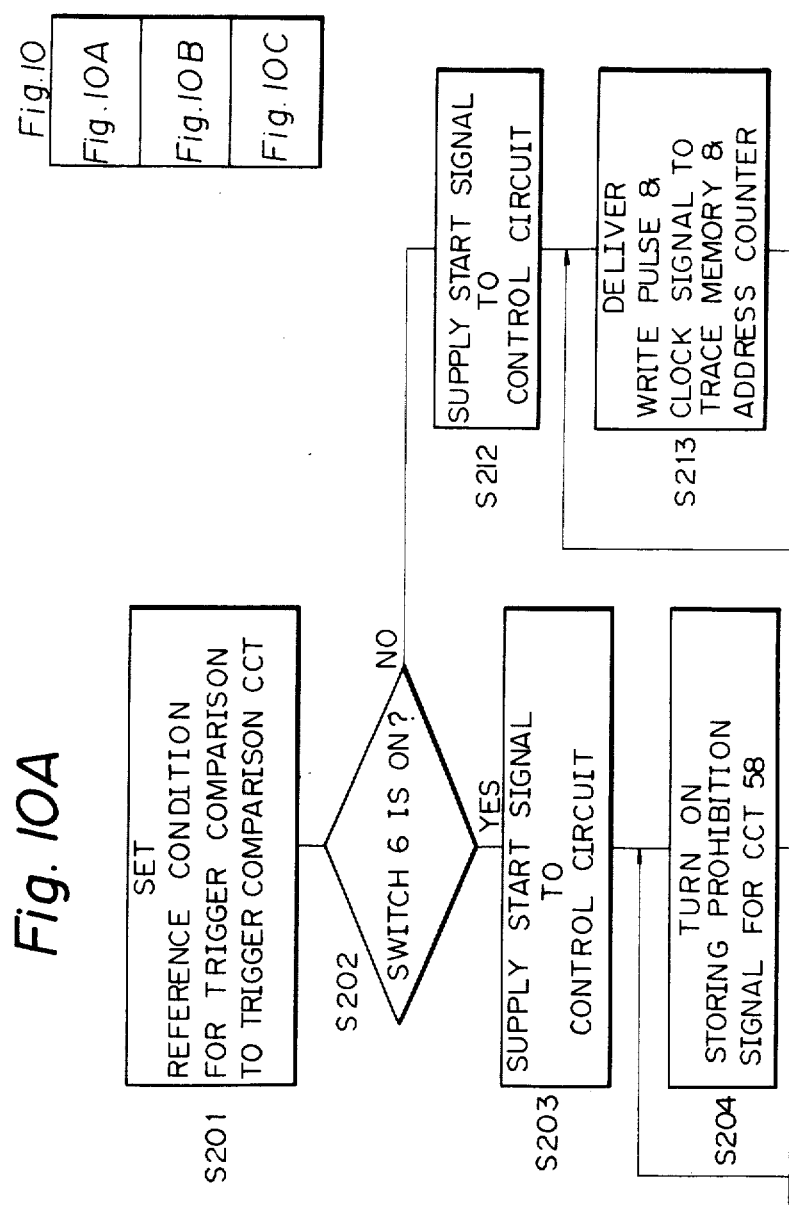

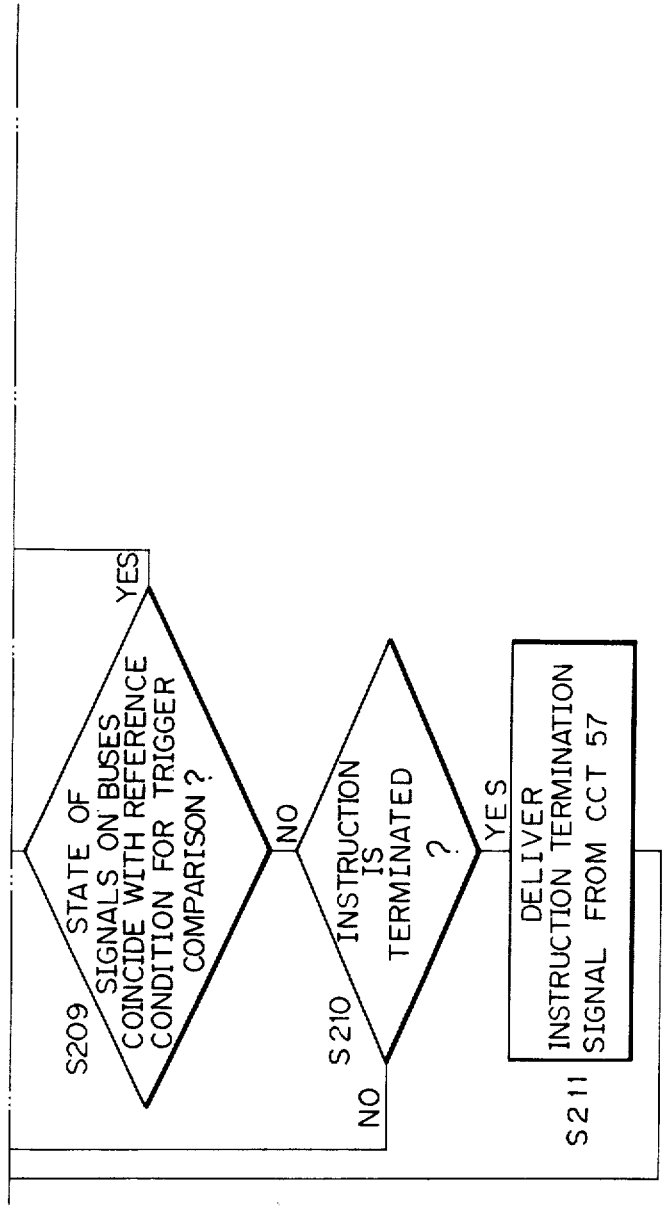

METHOD AND APPARATUS FOR ANALYSIS OF MICROPROCESSOR OPERATION

BACKGROUND OF THE INVENTION

1. Field of the Invention

The present invention relates to a method and an apparatus for analyzing the operation of a microprocessor. The method according to the present invention is used for analyzing the program and operation of an instrument or apparatus in which a microprocessor is used and for inspecting a failure in operation of such instrument or apparatus, in the form of, for example, a microprocessor analyzer or an in-circuit emulator.

2. Description of the Prior Art

In general, in a system for the analysis of the operation of a microprocessor, the signals on the data, address, and control buses connected to the microprocessor are compared with predetermined reference conditions in a trigger comparison circuit, and a coincidence signal, i.e., a trigger signal, is generated when the states of the signals on the data, address, and control buses coincide with the predetermined reference conditions.

Meanwhile, a write signal for a trace memory and a clock signal for an address counter of the trace memory are generated in a control circuit in accordance with the signal on the control bus connected to the microprocessor. Upon receipt of a start signal, the prohibition of the delivery of the write signal for the trace memory and the clock signal for the address counter for the trace memory is released in the control circuit, and hence the control circuit causes the trace memory to store sucessively the states of the signals on the data, address, and control buses connected to the microprocessor.

When a trigger signal is generated, the delivery of the write signal for the trace memory and the clock signal for the address counter for the trace memory is again prohibited, so that the trace memory maintains the storage of the states of the signals on the data, address, and control buses connected to the microprocessor prior to the delivery of the trigger signal.

The stored states of signals on the data, address, and control buses in the trace memory are then converted into a hexadecimal code or a mnemonic code of the microprocessor, and the converted states of the signals are displayed on a display device, such as a cathode ray tube. Thus, it is possible to observe the sequence of the instruction execution by the microprocessor by the time the trigger signal is generated, and hence to discover errors in the used program and to carry out an analysis of the operation of the microprocessor.

In the above-described processes, the states of the signals on the buses are successively stored, in the trace memory in such a manner that all states of the signals on the buses, including interrupt routine and subroutine processes, are stored. However, where the discovery of the program errors and the analysis of the microprocessor operation is intended to be carried out under the condition that the interrupt routine and subroutine processes have been proved correct, it is not always necessary to store the correct processes of the interrupt routine and subroutine in the trace memory.

In this case, the storing of all states of the signals on the buses, including interrupt routine and subroutine processes, presents the undesirable effect wherein the analysis of the microprocessor operation cannot be effectively made. Even if the analysis of the main routine of the microprocessor is desired, most of the trace memory capacity is occupied by the storage of the interrupt routine and subroutine processes, and as a result, the utilization efficiency of the trace memory is deteriorated from the viewpoint of the analysis of the main routine. Thus, the above-described situation constitutes a problem in the prior art.

Also, it has been known in a prior art case that it has become necessary to trace the changes of the stack pointer in a stack memory in the microprocessor or in the system to be tested in order to analyze the program and operation of the microprocessor or to inspect failures of the operation. Errors in the program or failures in the operation often can be inspected by tracing the change of the stack pointer, particularly where the reason for the runaway of the program execution must be determined. In this case, each of the points where the stack pointer is changed must be determined and the analysis concerning the determined point must be carried out, since the entire program execution is successively stored in the trace memory. Since the capacity of the trace memory for storing the state of the signals on the buses is naturally limited, it is not desirable to attempt to increase that capacity. Thus, the above-described situation also constitutes another problem in the prior art.

SUMMARY OF THE INVENTION

The main object of the present invention is to provide an improved method and apparatus for analyzing the operation of a microprocessor in which the state of the instruction execution of the microprocessor is easily acknowledged, the discovery of program errors and the checking of operation failures is easily performed, and hence, the utilization efficiency of the trace memory is enhanced and, accordingly, the analysis of the operation of the microprocessor is advantageously achieved.

According to an aspect of the present invention, there is provided a method for analyzing the operation of a microprocessor connected to a system to be tested and a plurality of buses. This method includes the steps of: selecting, from information concerning the bus signal states and instruction execution, only information for cases other than interrupt routine processes and subroutine processes; storing the selected information into a memory device; and carrying out an analysis of the operation of the microprocessor on the basis of the selected and stored information.

According to another aspect of the present invention, there is provided a method for analyzing the operation of a microprocessor connected to a system to be tested and a plurality of buses. The method includes the steps of: selecting, from information concerning the bus signal states and instruction execution, only information for a case other than executions of stack pointer change instructions and interrupt response processes; storing the selected information into a memory device; and carrying out an analysis of the operation of the microprocessor on the basis of the selected and stored information.

BRIEF DESCRIPTION OF THE DRAWINGS

In the drawings.

FIGS. 8 and 9 illustrate examples of the timing of the sequence of operation of the device shown in FIG. 7.

DESCRIPTION OF THE PREFERRED EMBODIMENTS

Figure 1A:
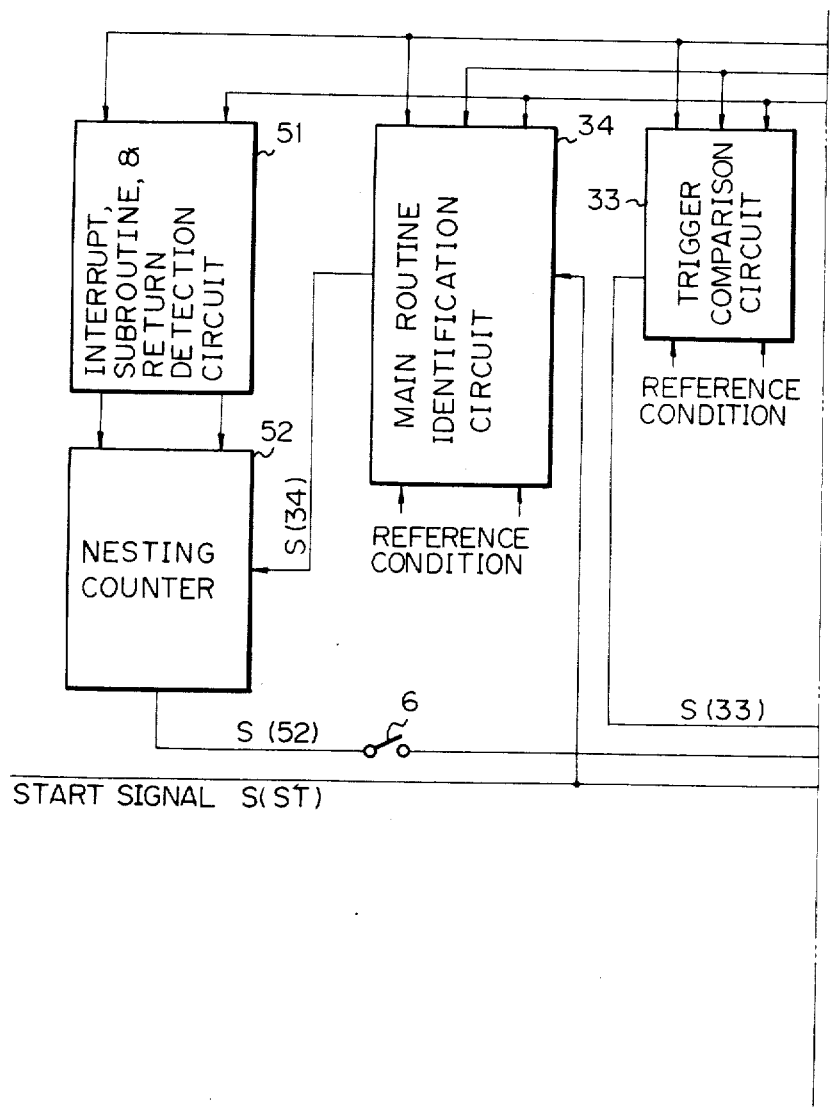
FIG. 1 depicts the relationship between FIGS. 1A and 1B, which show a device for analyzing the operation of a microprocessor according to an embodiment of the present invention.
Figure 1B:
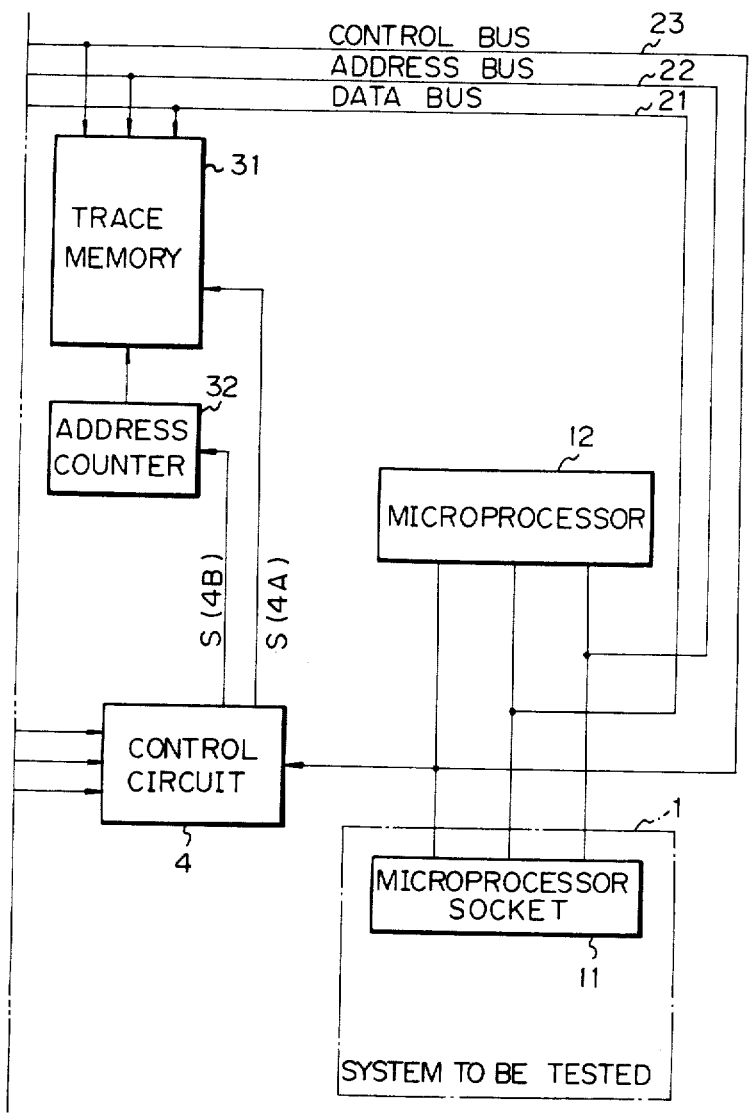

A device for analyzing the operation of a microprocessor according to an embodiment of the present invention is shown in FIG. 1. The device shown in FIG. 1 includes a system 1 to be tested to which a microprocessor 12 is connected via a microprocessor socket 11, and data, address, and control buses 21, 22, and 23, respectively, are connected to the microprocessor 12. The device shown in FIG. 1 also includes a trace memory 31, an address counter 32, a trigger comparison circuit 33, a main routine identification circuit 34, an interrupt, subroutine, and return detection circuit 51, a nesting counter 52, a switch 6, and a control circuit 4.

The trace memory 31 is connected to the data, address, and control buses and stores the information on these buses. The address counter 32 designates the address of the trace memory 31. The trigger comparison circuit 33, which is connected to the data, address, and control buses, compares the signals on the data, address, and control buses with a predetermined reference condition and, when a coincidence is attained in this comparison, delivers a trigger signal S(33). The main routine comparison circuit 34, which is connected to the data, address, and control buses, compares the signals on the data, address, and control buses with a predetermined reference condition for the main routine. When a coincidence is attained in this comparison, the state of the data, address, and control buses is identified as the main routine state, and a resulting main routine identification signal S(34) is delivered.

The interrupt, subroutine, and return detection circuit 51, which is connected to the data and control buses, detects an interrupt, a subroutine call, and an execution of a return (from interrupt or subroutine) instruction and delivers an interrupt or subroutine detection signal and a return from interrupt or subroutine signal. The nesting counter 52 counts the nesting of the interrupt or subroutine, which is the number of levels of interrupt or subroutine, in order to deliver a memory prohibition signal when the instruction in an interrupt processing routine or a subroutine is executed.

The switch 6 is in an ON state when the information on the data, address, and control buses is to be stored in the trace memory 31, and is in an OFF state when the information on the data, address, and control buses is not to be stored in the trace memory 31.

The operation of the device shown in FIG. 1 will be now described. It is assumed that the switch 6 is in the ON state. The reference condition for the trigger comparison circuit 33, with which the entire operation of the trace memory 31 is to be terminated, is preliminarily set. The reference condition for the main routine identification circuit 34, with which the main routine is to be stored in the trace memory 31, is also preliminarily set.

When the start signal S(ST) is supplied to the control circuit 4 and to the main routine identification circuit 34, the control circuit 4 supplies the trace memory 31 with a write pulse S(4A), and the address counter 32 with a clock signal S(4B), and the signals on the data, address, and control buses are stored in the trace memory 31, and also the main routine identification circuit 34 commences the comparison between the signals on the data, address, and control buses and the reference condition.

When the main routine identification signal S(34) is in the OFF state, the count of the nesting counter 52 is zero, and the nesting counter 52 cannot carry out counting. When the signals of the data, address, and control buses coincide with the reference condition, the main routine identification signal S(34) becomes ON and the nesting counter 52 can carry out the counting.

The nesting counter 52, which is an up/down counter, carries out up-counting upon receipt of the interrupt or subroutine detection signal from the circuit 51, and carries out down-counting upon receipt of the return detection signal from the circuit 51.

When the count of the nesting counter 52 is zero, no interrupt or subroutine storing prohibition signal is delivered from the nesting counter 52, so that the storing operation of the trace memory 31 can be carried out. When the count of the nesting counter 52 is other than zero, the interrupt or subroutine storing prohibition signal S(52) is delivered from the nesting counter 52, so that the storing operation of the trace memory 31 is prohibited.

That is, when an interrupt or subroutine call instruction has been once executed after the signals on the data, address, and control buses become coincident with the reference condition, the count of the nesting counter 52 is increased to become one, and the storing operation of the trace memory 31 is prohibited.

Then, when a return instruction has been executed, the count of the nesting counter 52 is decreased to become zero, and the storing operation of the trace memory 31 is restarted.

In the nesting situation, that is, where an interrupt routine or a subroutine contains another subroutine, the count of the nesting counter 52 is incremented by one for each execution of the interrupt or subroutine call instruction, and is decremented by one for each execution of the return instruction. After this decrement, when the count of the nesting counter 52 reaches zero, the storing operation of the trace memory 31 is restarted.

Figure 3:
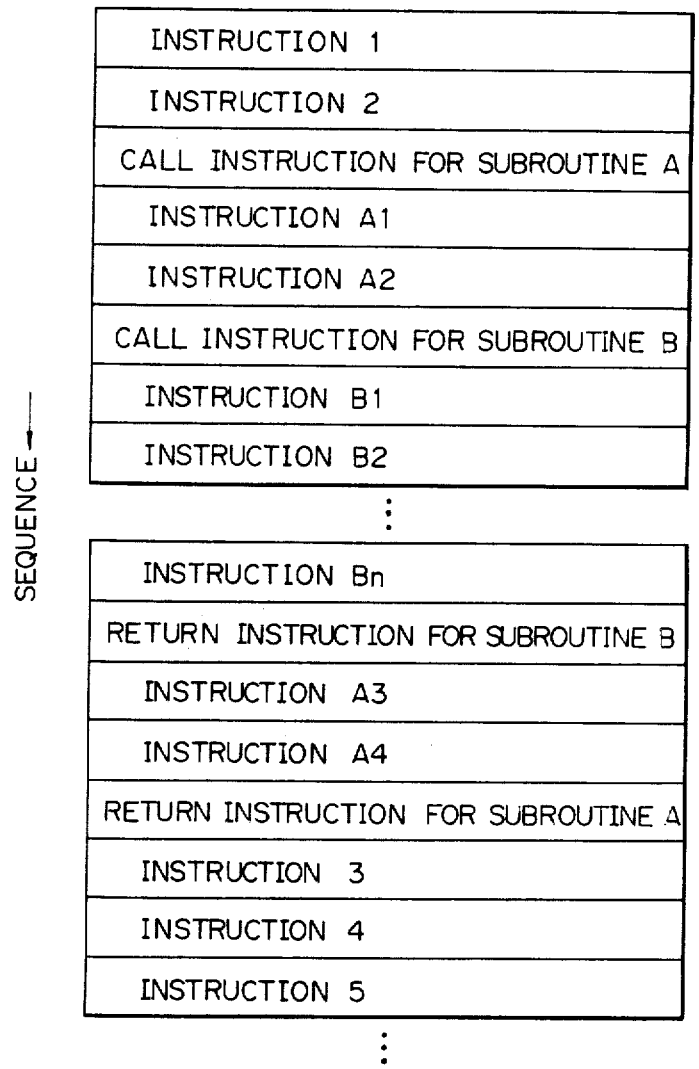

FIG. 3 is a chart showing the sequence of examples of the subroutines of the nesting situation. FIG. 3 shows the sequence of the storing into the trace memory 31 of the signals on the data, address, and control buses when the switch 6 is OFF, and FIG. 4 shows the sequence when the switch 6 is ON.

Figure 2:
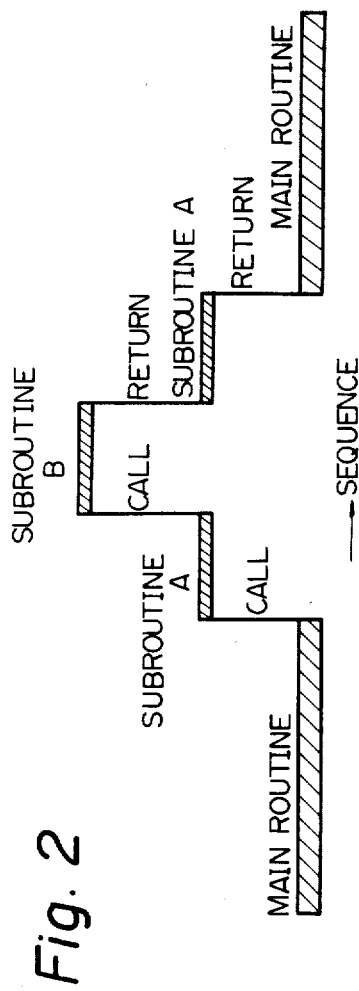
FIGS. 2, 3, and 4 are charts showing the sequence of examples of the operation of the device shown in FIG. 1.

In FIG. 2, the entire routine consists of the main routine at the zero level, the subroutine A at the first level, and the subroutine B at the second level.

FIG. 3 shows the sequence of the stored execution of the instructions, as follows: instruction 1; instruction 2; call instruction for subroutine A; instruction A1; instruction A2; call instruction for subroutine B; instruction B1; instruction B2; . . . instruction Bn; return instruction for subroutine B; instruction A3; instruction A4; return instruction for subroutine A; instruction 3; instruction 4; and instruction 5; . . . FIG. 4 shows the sequence of the stored execution of instructions, as follows: instruction 1; instruction 2; call instruction for subroutine A; instruction 3; instruction 4; and instruction 5; . . .

Figure 4:
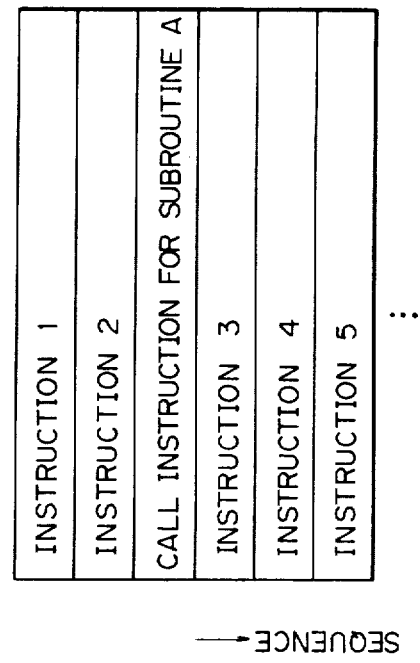

Note: the sequence from the call instruction for subroutine A to the return instruction for subroutine A shown in FIG. 3 is eliminated from the sequence shown in FIG. 4.

Figure 5C:
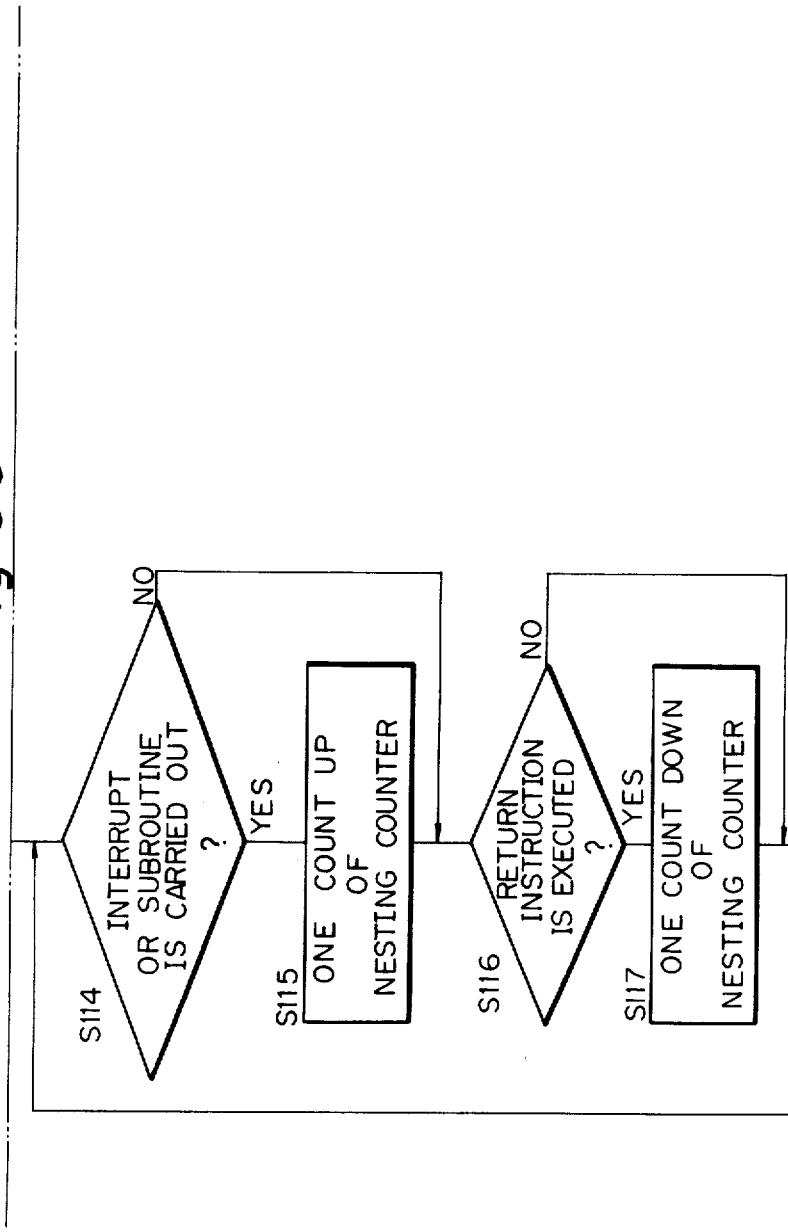
FIG. 5 depicts the relationship between FIGS. 5A, 5B, 5C, and 5D, which are a flow chart of the operation of the device shown in FIG. 1.

The flow chart of the operation of the device in FIG. 1 is shown in FIG. 5. In step S101, the reference condition is set to the trigger comparison circuit 33. In step S102, the decision on whether or not the switch 6 is ON is made. When the decision is YES, the process proceeds to step S103 where the reference condition is set to the main routine identification circuit 34.

In step S104, a start signal S(ST) is supplied to the control circuit 4 and the main routine identification circuit 34. In step S105, the nesting counter is reset to make the storing prohibition signal S(52) OFF. In step S106, the control circuit 4 generates the writing pulse for the trace memory 31 and the clock signal for the address counter 32.

When the decision in step S102 is NO, the process proceeds to step S107 where a start signal S(ST) is supplied to the control circuit 4. In step S108, the control circuit 4 generates the write pulse for the trace memory 31 and the clock signal for the address counter 32.

In step S109, the decision on whether or not the states of the data, address, and control buses coincide with the reference condition for trigger comparison is made. If the decision is NO, the process returns to step S108; if the decision is YES, the storing operation of the trace memory 31 is terminated (S110).

In step S111, the decision on whether or not the states of the data, address, and control buses coincide with the reference condition for trigger comparison is made. If the decision is NO, the process proceeds to step S113; if the decision is YES, the storing operation of the trace memory 31 is terminated (S112).

In step S113, the decision whether or not the states of the data, address, and control buses coincide with the reference condition for main routine identification is made. If the decision is NO, the decision process is repeated; if the decision is YES, the process proceeds to step S114.

In step S114, the decision on whether or not an interrupt operation or a subroutine operation takes place is made. If the decision is YES, the process proceeds to step S115; if the decision is NO, the process proceeds to step S116. In step S115, the count of the nesting counter 52 is incremented by one.

In step S116, the decision on whether or not a return operation instruction is executed is made. If the decision is NO, the process proceeds to step S118; if the decision is YES, the process proceeds to step S117. In step S117, the count of the nesting counter 52 is decremented by one.

In step S118, the decision on whether or not the count of the nesting counter 52 is zero is made. If the decision is YES, the process proceeds to step S120; if the decision is NO, the process proceeds to step S119.

In step S119, the storing prohibition signal S(52) is made ON. In step S120, the storing prohibition signal S(52) is made OFF.

In step S121, the decision on whether or not the states of the data, address, and control buses coincide with the reference condition for trigger condition is made. If the decision is NO, the process returns to step S114; if the decision is YES, the storing operation of the trace memory 31 is terminated (S122).

Figure 6A:
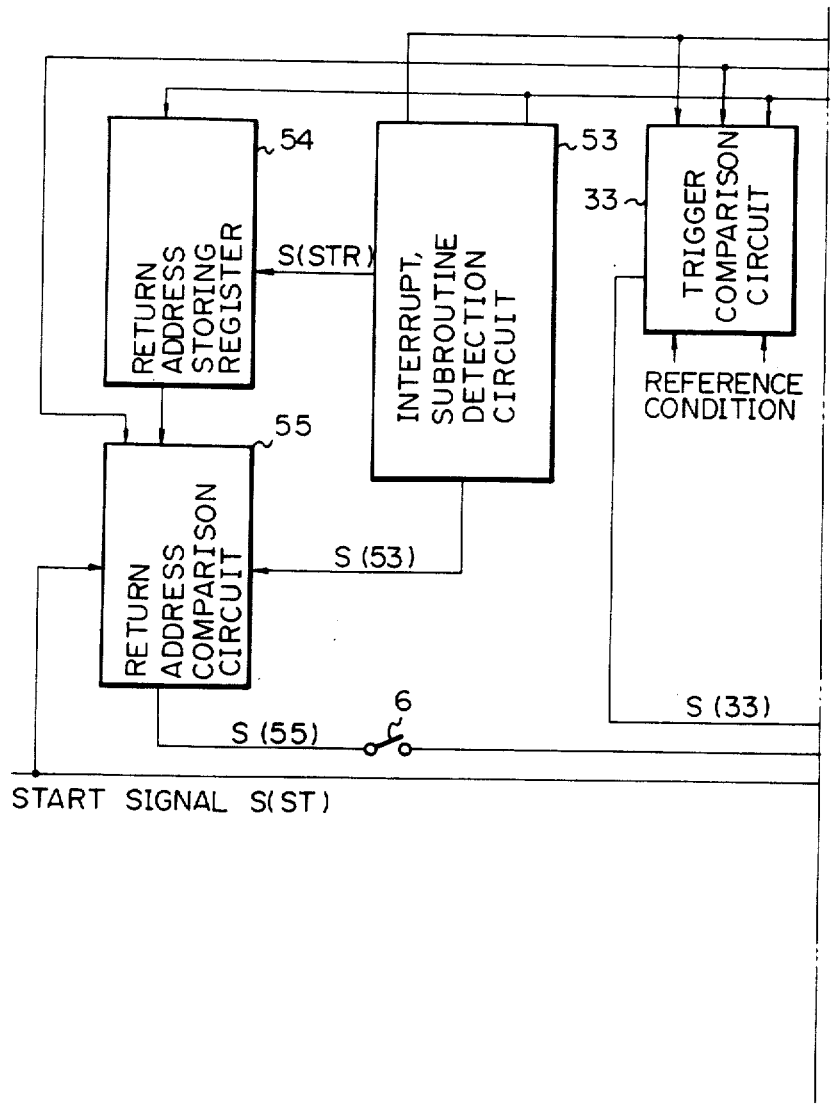
FIG. 6 depicts the relationship between FIGS. 6A and 6B, which show a device for analyzing the operation of a microprocessor according to another embodiment of the present invention.
Figure 6B:
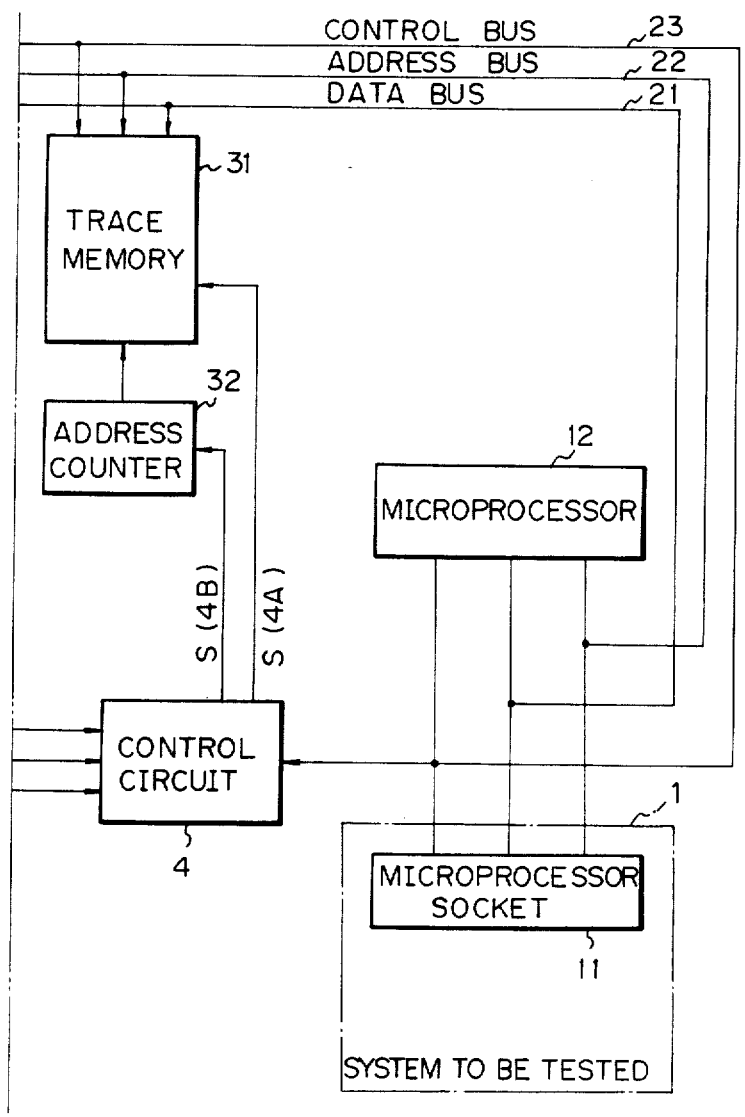

A device for analyzing the operation of a microprocessor according to another embodiment of the present invention is shown in FIG. 6. The device shown in FIG. 6 includes an interrupt or subroutine detection circuit 53 which detects an interrupt or a subroutine call and generates a strobe pulse S(STR) for storing a return address in a return address storing register 54 after an interrupt or subroutine process. The return address storing register 54 stores the return address in the interrupt or subroutine process and supplies the return address comparison circuit 55 with the stored return address as a comparison data.

The return address comparison circuit 55 compares the return address stored in the return address storing register 54 with the signal on the address bus 22, and delivers a storing prohibition signal S(55).

The operation of the device shown in FIG. 6 will now be described. It is assumed that the switch 6 is ON. The reference condition is preliminarily set for the trigger comparison circuit 33. Upon supplying the control circuit 4 and the return address comparison circuit 55 with the start signal S(ST), the control circuit 4 commences to supply the trace memory 31 with the write pulse S(4A) and the address counter 32 with the clock signal S(4B), so that the states of the signals on the data, address, and control buses are stored in the trace memory 31.

Then, after the execution of an interrupt instruction or a subroutine call instruction, the interrupt, subroutine detection circuit 53 delivers the strobe signal S(ST) for the return address of the interrupt or subroutine to the return address storing register 54. The return address storing register 54 then stores the return address and supplies the stored return address as a reference condition to the return address comparison circuit 55.

Meanwhile, the interrupt, subroutine detection signal S(53) from the circuit 53 is supplied to the return address comparison circuit 55. The return address comparison circuit 55 delivers the storing prohibition signal S(55), and commences the comparison between the states of the signals on the data, address, and control buses with the return address from the return address storing register 54. Upon receipt of the storing prohibition signal, the control circuit 4 prohibits the supply of the write pulse S(4A) to the trace memory 31 and the supply of the clock signal S(4B) to the address counter 32, so that the storing operation of the trace memory 31 is interrupted.

After the return (from interrupt or subroutine) instruction is executed and the return address is supplied to the address bus 22, the return address comparison circuit 55 makes the storing prohibition signal S(55) OFF, and the storing of the trace memory 31 is restarted.

The above-described process is carried out each time an interrupt or subroutine call instruction is executed. When the state of the signals on the data, address, and control buses coincides with the reference condition for trigger comparison after the repetition of the above-described process, the storing operation of the trace memory 31 is conclusively terminated.

Figure 7B:
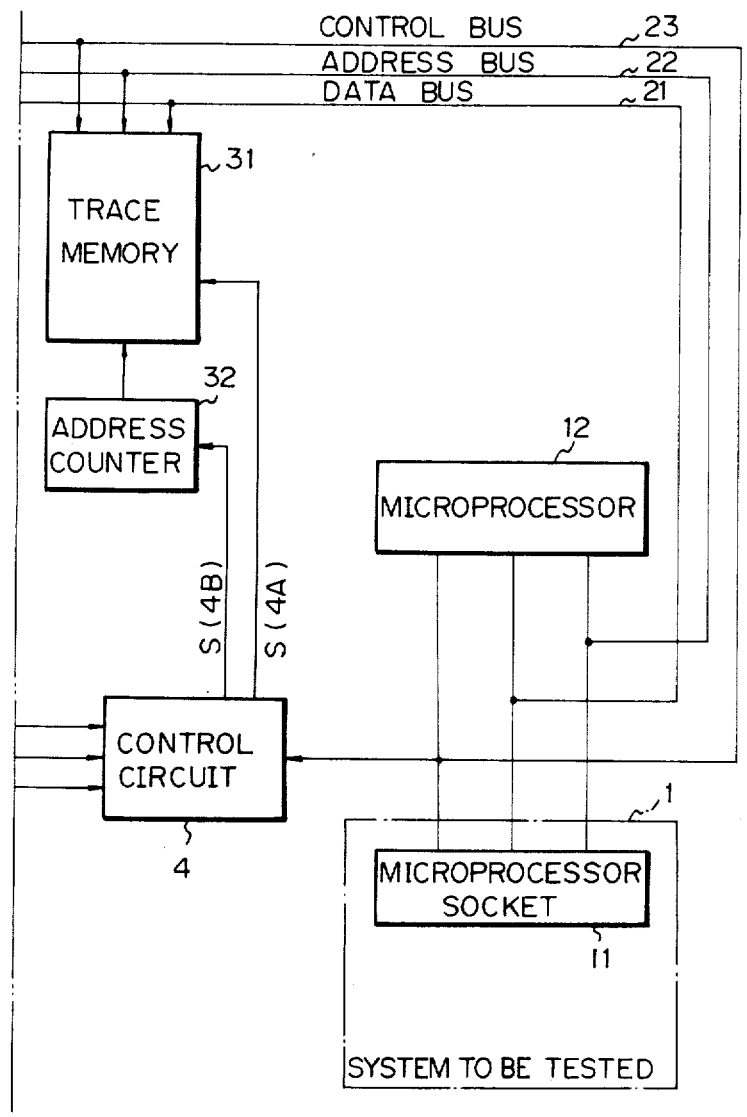
FIG. 7 depicts the relationship between FIGS. 7A and 7B, which show a device for analyzing the operation of a microprocessor according to further embodiment of the present invention.

A device for analyzing the operation of a microprocessor according to a further embodiment of the present invention is shown in FIG. 7. The device shown in FIG. 7 includes a circuit 56 for detecting a stack pointer (SP) changing instruction execution or an interrupt response generation, a circuit 57 for detecting the termination of an instruction cycle, and a circuit 58 for generating a storing prohibition signal S(58) upon receipt of an instruction termination detection signal from the circuit 57.

The operation of the device shown in FIG. 7 will now be described. It is assumed that the switch 6 is ON. A reference condition for trigger comparison is preliminarily set for the trigger comparison circuit 33. Upon supply of the start signal to the control circuit 4, the storing operation is started. However, unless the stack pointer changing instruction or response to interrupt exists, the storing prohibition circuit 58 delivers the storing prohibition signal S(58), and hence, neither a write pulse S(4A) nor a clock signal S(4B) is delivered from the control circuit 4 and, accordingly, storing is not carried out to the trace memory 31.

When either a stack pointer changing instruction is executed or a response to an interrupt is generated, the stack pointer changing instruction execution or interrupt response generation detection circuit 56 delivers a stack pointer changing instruction and interrupt detection signal S(56) and, hence, the storing prohibition signal generation circuit 58 stops delivery of the storing prohibition signal. Then a writing-in pulse S(4A) and a clock signal S(4B) are delivered from the control circuit 4, and the state of the buses during the execution of the stack pointer changing instruction or response to interrupt is stored in the trace memory 31.

When the stack pointer changing instruction or response to interrupt is terminated, the instruction cycle termination detection circuit 57 delivers an instruction termination detection signal S(57). Upon receipt of this signal S(57), the storing prohibition signal generation circuit 58 again delivers a storing prohibition signal S(58). Upon receipt of this storing prohibition signal S(58), the control circuit 4 stops delivery of the write pulse S(4A) and the clock signal S(4B).

The above described process is carried out each time a stack pointer changing instruction is executed or a response to interrupt occurs. Hence, only the states of the buses at the time a stack pointer changing instruction is executed or a response to interrupt occurs are stored in the trace memory 31.

When the trigger comparison circuit 33 detects a coincidence between the reference condition for trigger comparison and the state of the data, address, and control buses, the circuit 33 delivers a trigger signal S(33) and, hence, the storing operation of the trace memory 31 is terminated.

Figure 9:
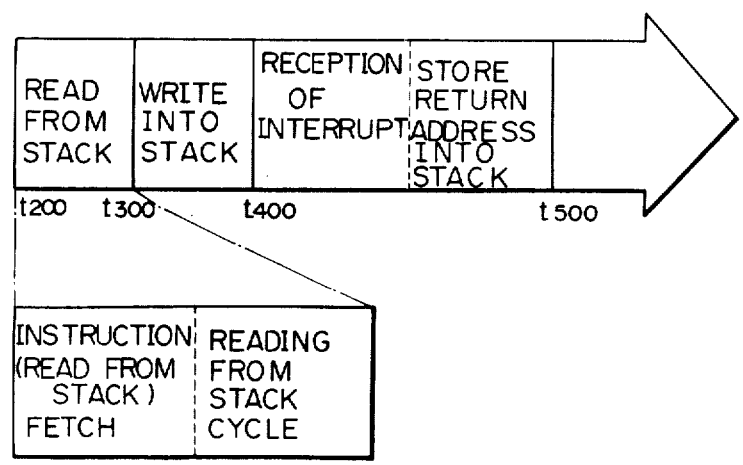

An example of the timing of the sequence of the operation of the device shown in FIG. 7 is illustrated in FIG. 8 for when the switch 6 is OFF, and in FIG. 9 for when the switch 6 is ON.

In the sequence shown in FIG. 8, a first basic process is started at timing t10. After the basic process, at timing t20, an instruction for reading from the stack occurs. At timing t30, after a second basic process, an instruction for writing into the stack occurs. At timing t40, after a third basic process, the reception of an interrupt and storing the return address into the stack occurs.

In the sequence shown in FIG. 9, an instruction for reading from the stack is started at timing t200. At timing t300, after the instruction for reading from the stack, an instruction for writing into the stack is started. At timing t400, after the instruction for writing into the stack, a reception of an interrupt and storing the return address into the stack is started. At timing t500, after storing the return address into the stack, the next instruction (a fourth basic process) is started.

Figure 10B:
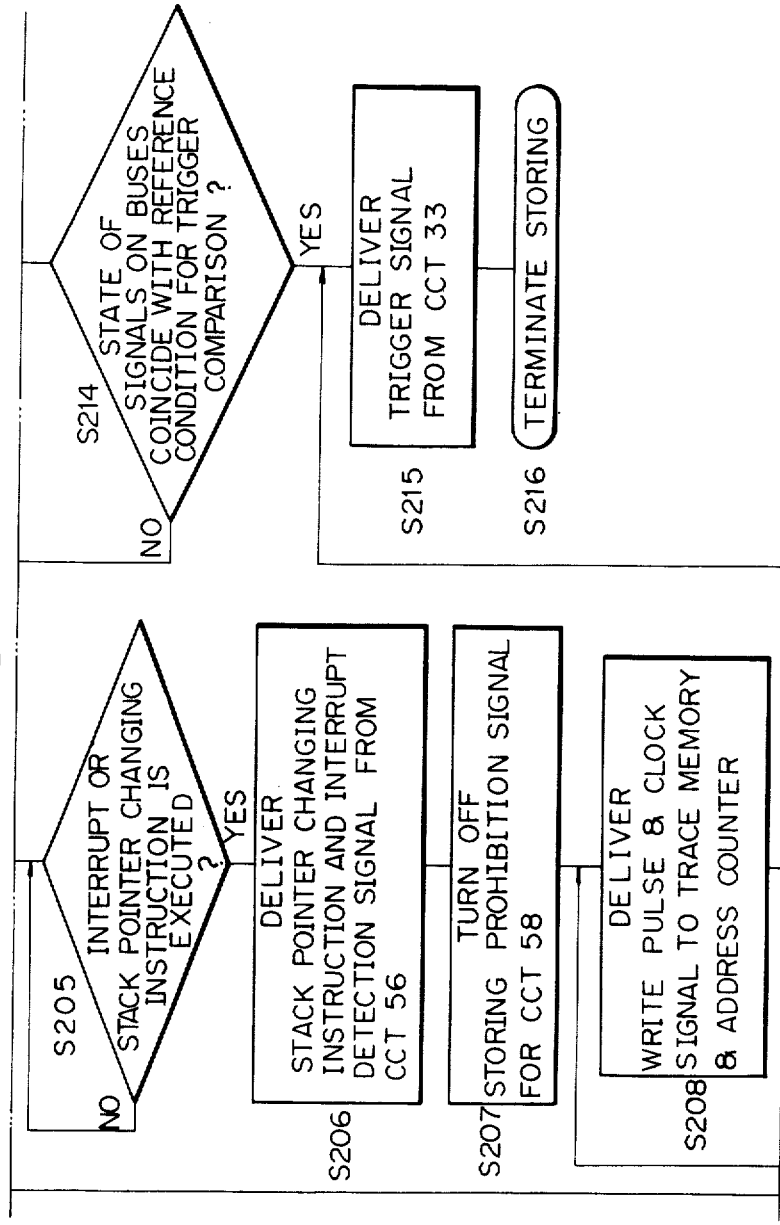
FIG. 10 depicts the relationship between FIGS. 10A, 10B, and 10C, which are a flow chart of the operation of the device shown in FIG. 7.

As illustrated in FIG. 9, the instruction for reading from the stack in the sequence shown in the Figure consists of the first portion: an instruction fetch for reading from the stack, and the second portion: a cycle for reading from the stack. The flow of the above-described operation of the device shown in FIG. 7 is fully described in the flow chart shown in FIG. 10.

I claim:

1. A device for analyzing the operation of a microprocessor in a system to be tested comprising:
   a main routine identification circuit for generating a main routine identification signal when a predetermined reference condition for a main routine and signals on data, address and control buses of said microprocessor in a system to be tested are coincident;
   an interrupt subroutine and return detection circuit for detecting an execution of an interrupt, a subroutine call and a return instruction out of the data, address and control buses, and for generating an interrupt subroutine detection signal and a return from interrupt or subroutine signal;
   a nesting counter for generating a memory prohibition signal upon receipt of said interrupt subroutine detection signal or upon receipt of said return from interrupt or subroutine signal after receipt of said main routine identification signal;
   a trigger comparison circuit for generating a trigger signal when a predetermined reference condition for a termination and signals on the data, address and control buses are coincident;
   a trace memory for storing the signal on the data, address and control buses of instruction execution processes;
   an address counter for designating addresses of said trace memory; and
   a control circuit for generating a write pulse for said trace memory and a clock signal for said address counter until receiving the trigger signal by inputting a signal on the control bus of said microprocessor and the memory prohibition signal, whereby signals on the data, address and control buses in instruction execution processes other than interrupt routine processes and subroutine processes are stored into said trace memory.

2. A device for analyzing the operation of a microprocessor in a system to be tested comprising:
   an interrupt, subroutine detection circuit for detecting an interrupt or a subroutine call out of signals on data, address and control buses of said microprocessor, and for generating an interrupt, subroutine detection signal and a strobe pulse;
   a return address storing register for storing a return address in an interrupt or subroutine process by said strobe pulse;
   a return address comparison circuit for detecting a coincidence between the return address stored in the return address storing register and a signal on the address bus, and for generating a storing prohibition signal from receipt of the interrupt, subroutine detection signal to the detection of the coincidence;

a trigger comparison circuit for generating a trigger signal when a predetermined reference condition for a termination and signals on the data, address and control buses are coincident;

a trace memory for storing the signals on the data, address and control buses of instruction execution processes;

an address counter for designating addresses of said trace memory; and a control circuit for generating a write pulse for said trace memory and a clock signal for said address counter until receiving the trigger signal by inputting a signal on the control bus of said microprocessor and the memory prohibition signal, whereby signals on the data, address and control buses in instruction execution processes other than interrupt routine processes and subroutine processes are stored into said trace memory.

3. A device for analyzing the operation of a microprocessor in a system to be tested comprising:

a stack pointer changing instruction execution or interrupt response generation detection circuit for detecting a stack pointer changing instruction execution or an interrupt response generation out of signals on data, address and control buses, and for generating a stack pointer changing instruction and interrupt detection signal;

an instruction cycle termination detection circuit for detecting a termination of the stack pointer changing instruction execution or the interrupt response generation out of the signal on the control bus, and for generating an instruction termination detection signal;

a storing prohibition signal generation circuit for generating a storing prohibition signal, wherein the storing prohibition signal is stopped by the stack pointer changing instruction and interrupt detection signal, and is regenerated by the instruction termination detection signal;

a trigger comparison circuit for generating a trigger signal when a predetermined reference condition for a termination and signals on the data, address and control buses are coincident;

a trace memory for storing the signals on the data, address and control buses of instruction execution processes;

an address counter for designating addresses of said trace memory; and a control circuit for generating a write pulse for said trace memory and a clock signal for said address counter until receiving the trigger signal by inputting a signal on the control bus of said microprocessor and the storing prohibition signal, whereby only signals on the data, address and control buses in the interrupt response processes and execution processes of stack pointer changing instructions are stored into said trace memory.

* * * * *